(12) United States Patent
Ishikura

(10) Patent No.: US 6,311,563 B1
(45) Date of Patent: Nov. 6, 2001

(54) PRESSURE SENSOR

(75) Inventor: Yoshiyuki Ishikura, Kanagawa (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 09/404,033

(22) Filed: Sep. 23, 1999

(30) Foreign Application Priority Data

Sep. 29, 1998 (JP) .................................. 10-275778

(51) Int. Cl.⁷ ...................................................... G01L 9/12
(52) U.S. Cl. .............................................................. 73/724
(58) Field of Search ........................... 73/720, 721, 722, 73/723, 724, 715, 716, 717, 718, 719; 29/25.41, 621.1; 338/4; 361/283.4

(56) References Cited

U.S. PATENT DOCUMENTS

| | | | |
|---|---|---|---|
| 4,127,840 | 11/1978 | House | 338/4 |
| 4,683,755 | 8/1987 | Samek | 73/727 |
| 4,753,109 | * 6/1988 | Zabler et al. | 73/115 |
| 5,005,421 | * 4/1991 | Hegner et al. | 73/724 |
| 5,024,098 | 6/1991 | Petijean et al. | |
| 5,186,055 | * 2/1993 | Kovacich et al. | 73/727 |
| 5,349,492 | 9/1994 | Kimura et al. | |
| 5,869,766 | * 2/1999 | Cucci et al. | 73/706 |

FOREIGN PATENT DOCUMENTS 63-87469   4/1988   (JP) .

* cited by examiner

Primary Examiner—William Oen
(74) Attorney, Agent, or Firm—Blakely Sokoloff Taylor & Zafman

(57) ABSTRACT

A pressure sensor includes a sapphire base, a sapphire diaphragm, a capacitance chamber, a stationary electrode, and a movable electrode. The base has an R-plane major surface. The sapphire diaphragm is formed on the major surface of the base and has an R-plane major surface. The capacitance chamber has an upper surface covered with the diaphragm and has a recess formed in the major surface of the base. The stationary electrode is fixed to a bottom surface of the capacitance chamber. The movable electrode is fixed to a lower surface of the diaphragm in the capacitance chamber to oppose the stationary electrode. At least one of the movable and stationary electrodes has a shape extending on at least one of a line in a C-axis projection direction of a crystal passing through a center of the major surface of the diaphragm and a line in a direction perpendicular to the C-axis projection direction.

10 Claims, 6 Drawing Sheets

PRESSURE SENSOR

BACKGROUND OF THE INVENTION

The present invention relates to a pressure sensor for measuring a pressure by detecting a change in electrostatic capacitance.

In general, a chip-like capacitance type pressure sensor for detecting a pressure by detecting an electrostatic capacitance has a substrate, a diaphragm which forms a space together with the substrate, a stationary electrode disposed on the substrate, and a movable electrode fixed to the diaphragm to oppose the stationary electrode. In the pressure sensor chip having this arrangement, when the diaphragm is displaced upon reception of a pressure, the distance between the movable and stationary electrodes changes to change the electrostatic capacitance between them. The pressure applied to the diaphragm can be measured on the basis of this change in electrostatic capacitance.

As a housing comprised of the substrate and diaphragm of such a pressure sensor chip, one made of sapphire (artificial corundum) is proposed. When sapphire is used to form the housing, even if the measurement target is a corrosive body or fluid, the housing can directly receive the body or fluid with its diaphragm to measure the pressure.

FIGS. 4A and 4B show the arrangement of a conventional pressure sensor chip.

Referring to FIG. 4A, the conventional pressure sensor chip is constituted by a base 401 and a diaphragm 402. A circular recessed capacitance chamber 401a is formed at the center of the major surface of the base 401. The diaphragm 402 is bonded to the major surface of a rim portion 401b surrounding the capacitance chamber 401a to cover it, thereby forming a closed space in the capacitance chamber 401a. The base 401 and diaphragm 402 are made from sapphire.

A circular stationary electrode 403 is fixed to the bottom surface of the capacitance chamber 401a, and a small disk-like movable electrode 404 is fixed to the lower surface (the capacitance chamber 401a side) of the diaphragm 402 to oppose the stationary electrode 403. The movable electrode 404 is arranged at substantially the center of the diaphragm 402. Furthermore, a ring-like reference electrode 405 is fixed to the lower surface of the diaphragm 402 to oppose the stationary electrode 403. The reference electrode 405 has a ring diameter smaller than the diameter of the stationary electrode 403, and is arranged to surround the movable electrode 404. At the periphery of the capacitance chamber 401a, a lead portion 404a extending from the movable electrode 404 is connected to a pin 406 extending through the base 401, as shown in FIG. 4B.

In the pressure sensor chip having the above arrangement, the opposing stationary and movable electrodes 403 and 404 constitute a capacitor. Hence, upon reception of an external pressure, when the center of the diaphragm 402 is displaced toward the base 401, the distance between the stationary and movable electrodes 403 and 404 changes to change the capacitance between them. This change in capacitance is electrically detected through the lead portion 404a, the pin 406, and the like, so that the pressure acting on the diaphragm 402 can be detected.

The reference electrode 405 formed on the diaphragm 402, and the stationary electrode 403, that are adjacent to each other, also form a capacitance between them. Since the reference electrode 405 is arranged close to the rim portion 401b, the warp amount of the reference electrode 405 accompanying warp of the diaphragm 402 is smaller than that of the movable electrode 404 arranged at the center of the diaphragm 402.

The dielectric constant of air in the capacitance chamber 401a changes in accordance with the humidity, to accordingly change the capacitances of the respective electrodes. If the change in capacitance between the stationary and movable electrodes 403 and 404 is observed with reference to a change in capacitance between the stationary and reference electrodes 403 and 405, the warp amount of the diaphragm 402 can be detected without fluctuation even if the dielectric constant of air in the capacitance chamber 401a changes.

Concerning sapphire used in the substrate and diaphragm constituting the pressure sensor, a sapphire substrate having an R plane as a major surface is used in terms of cost and availability. As shown in FIG. 5, the R plane of a sapphire crystal is a plane that forms an angle of 57.6° with the C plane.

When sapphire crystals are grown by the EFG (Edge-defined Film-fed Growth method) such that the R plane is set horizontal, a sapphire crystal plate having a large area to a certain degree can be obtained comparatively easily. In contrast to this, when crystal growth is performed while pulling sapphire upward in the direction of C axis, an ingot having a large diameter cannot be obtained. For this reason, it is very difficult at the present stage to obtain a crystal plate having a large C plane.

In an inexpensive sapphire substrate having an R plane as the flat surface, its physical properties such as Young's modulus and thermal expansion coefficient are anisotropic. When two sapphire wafers each having an R plane as the major surface are bonded to each other, the bonded wafer body warps unless the axes of the crystals of the respective wafer surfaces coincide with each other. This warp occurs depending on the axis in the R plane described above. This is supposed to be because a change in physical properties of the R-plane wafer caused by the temperature is large in some axis while it is small in another axis.

FIG. 6 shows how the warp occurs in accordance with a temperature change (temperature rise) of the diaphragm in the pressure sensor described above. In FIG. 6, the axis of abscissa represents the distance of a point where the warp amount is measured from the center. The center of the diaphragm is defined as 0, and the rightward direction from 0 indicates a positive value while the leftward direction from 0 indicates a negative value. Note that the warp amount of the diaphragm plotted along the axis of ordinate is a normalized value.

The sapphire diaphragm and base are bonded to each other more firmly when they are heated with their specular polished surfaces being in tight contact with each other. The diaphragm and base are bonded to each other such that their C-axis projection directions of their crystals are displaced from each other by about 10°.

Referring to FIG. 6, block dots represent the warp amount on a line along the C-axis projection direction of the diaphragm, and white dots represent the warp amount on a line forming an angle of 45° with the C-axis projection direction of one diaphragm. White triangles represent the warp amount on a line forming an angle of 90° with the C-axis projection direction of the diaphragm, and solid squares represent the warp amount on a line forming an angle of −45° with the C-axis projection direction of the diaphragm. All of these lines pass through the center of the diaphragm.

In this manner, when a diaphragm comprised of a sapphire R-plane substrate is adhered to a base comprised of a sapphire R-plane substrate such that their axes are displaced from each other (e.g., by about 10°), warping caused by a temperature change occurs. This warp is the maximum on a line forming an angle of 45° or −45° with the C-axis projection direction of the diaphragm, and on an intermediate region between the diaphragm center and the end of the diaphragm.

In the pressure sensor formed by bonding the base and diaphragm, when the C-axis projection direction of the sapphire crystal of the base is different from that of the diaphragm, the diaphragm warps even if no external pressure is applied to it. More specifically, in the conventional sapphire pressure sensor, when the temperature changes, even if no external pressure is applied, a detection signal is detected as if a pressure is actually applied.

When a displacement is present, if any, between the C-axis projection direction of the sapphire crystal of the base and that of the diaphragm, the diaphragm warps upon a temperature change. Meanwhile, the displacement between the base and diaphragm cannot be completely eliminated easily.

SUMMARY OF THE INVENTION

It is an object of the present invention to provide a pressure sensor which can detect a pressure highly precisely even if the C-axes projection direction of the sapphire crystal of a base and that of a diaphragm each made of an R-plane sapphire plate are different from each other.

In order to achieve the above object, according to the present invention, there is provided a pressure sensor comprising a sapphire base having an R-plane major surface, a sapphire diaphragm formed on the major surface of the base and having an R-plane major surface, a capacitance chamber having an upper surface covered with the diaphragm and having a recess formed in the major surface of the base, a stationary electrode fixed to a bottom surface of the capacitance chamber, and a movable electrode fixed to a lower surface of the diaphragm in the capacitance chamber to oppose the stationary electrode, wherein at least one of the movable and stationary electrodes has a shape extending on at least one of a line in a C-axis projection direction of a crystal passing through a center of the major surface of the diaphragm and a line in a direction perpendicular to the C-axis projection direction.

DESCRIPTION OF THE PREFERRED EMBODIMENTS

The present invention will be described in detail with reference to the accompanying drawings.

<First Embodiment>

Figure 1A:
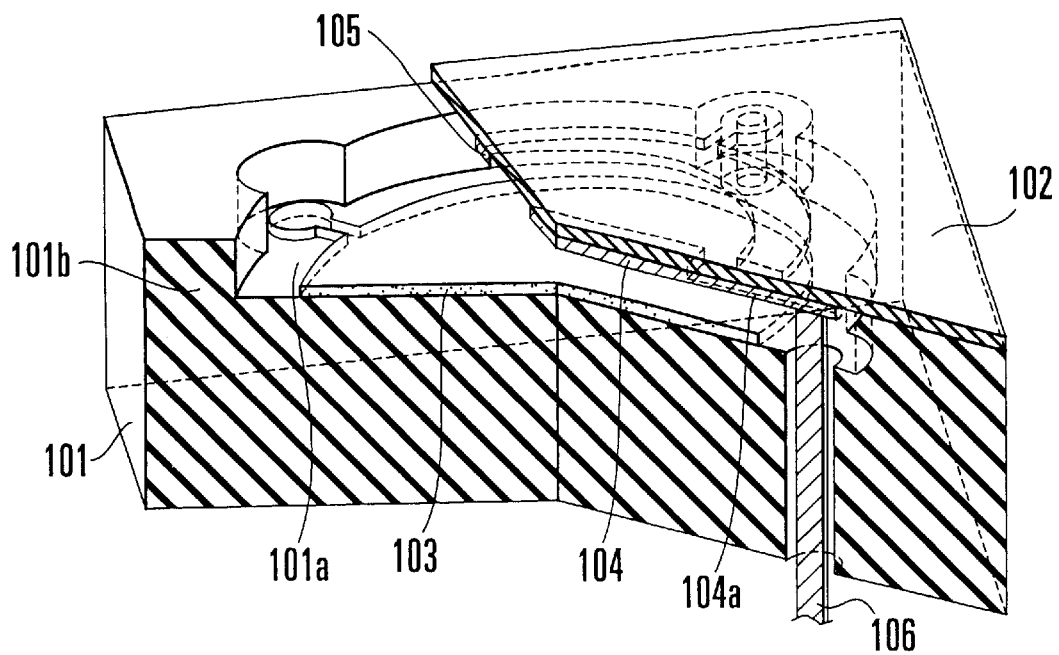
FIGS. 1A and 1B are a partially cutaway perspective view and a plan view, respectively, of a pressure sensor chip according to the first embodiment of the present invention.

Referring to FIG. 1A, a pressure sensor chip is constituted by a base 101 having a circular recessed capacitance chamber 101a, and a diaphragm 102. The diaphragm 102 is bonded to the major surface of a rim portion 101 surrounding the capacitance chamber 101a to cover it, thereby forming a closed space in the capacitance chamber 101a. The base 101 and diaphragm 102 are constituted by R-plane sapphire substrates. The diaphragm 102 is bonded to the base 101 such that the C-axis projection crystals of their crystals are almost aligned to each other (within ±15°).

Figure 1B:
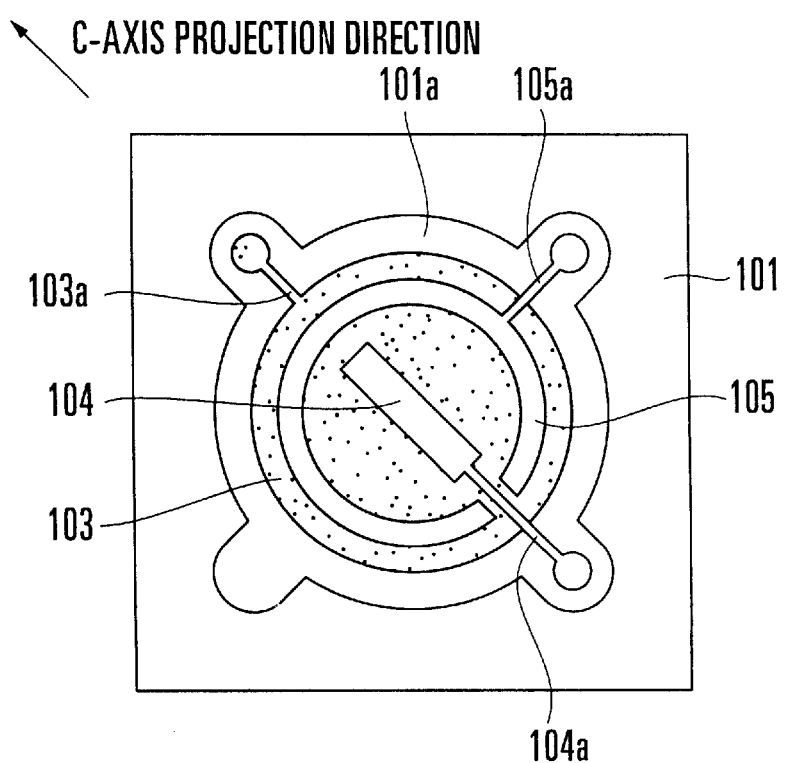

A circular stationary electrode 103 is fixed to the bottom surface of the capacitance chamber 101a, and a rectangular movable electrode 104 is fixed to the lower surface (the capacitance chamber 101a side) of the diaphragm 102 to oppose the stationary electrode 103. The movable electrode 104 is arranged such that its center overlaps almost the center of the diaphragm 102, and has a long side shorter than the diameter of the stationary electrode 103. The movable electrode 104 is arranged to extend in the C-axis projection direction of the sapphire crystal, as shown in FIG. 1B. More specifically, the movable electrode 104 is arranged such that its long side is parallel to the C-axis projection direction of the sapphire crystal.

A ring-like reference electrode 105 is fixed to the lower surface (the capacitance chamber 101a side) of the diaphragm 102 to oppose the stationary electrode 103. The reference electrode 105 has a ring diameter smaller than the diameter of the stationary electrode 103, and is arranged to surround the movable electrode 104.

At the periphery of the capacitance chamber 101a, the movable electrode 104 is connected to a pin 106 extending through the base 101, through a lead wiring line 104a. Similarly, at the periphery of the capacitance chamber 101a, the reference electrode 105 is connected to a pin (not shown) extending through the base 101, through a lead wiring line 105a. At the periphery of the capacitance chamber 101a, the stationary electrode 103 is also connected to a pin extending through the base 101, through a wiring line 103a. The electrodes 103, 104, and 105 are electrically connected to the outside through the lead wiring lines 103a, 104a, and 105a, and a plurality of pins including the pin 106.

In the pressure sensor chip having the above arrangement, the stationary and movable electrodes 103 and 104 constitute a capacitor. Hence, upon reception of an external pressure, the center of the diaphragm 102 is displaced toward the base 101. The distance between the stationary and movable electrodes 103 and 104 accordingly changes to change the capacitance between them. This change in capacitance is detected as a voltage change through the lead wiring lines 103a, 104a, and 105a, the pin 106, and the like, so that the pressure acting on the diaphragm 102 can be detected.

The movable electrode 104 is arranged on the diaphragm 102 to extend along a line on the C-axis projection direction of the sapphire crystal passing through the center of the major surface of the diaphragm 102. More specifically, the movable electrode 104 is formed into a rectangular shape elongated in the C-axis projection direction of the sapphire crystal. As described above, the diaphragm 102 sometimes warps due to a temperature change.

Figure 6:
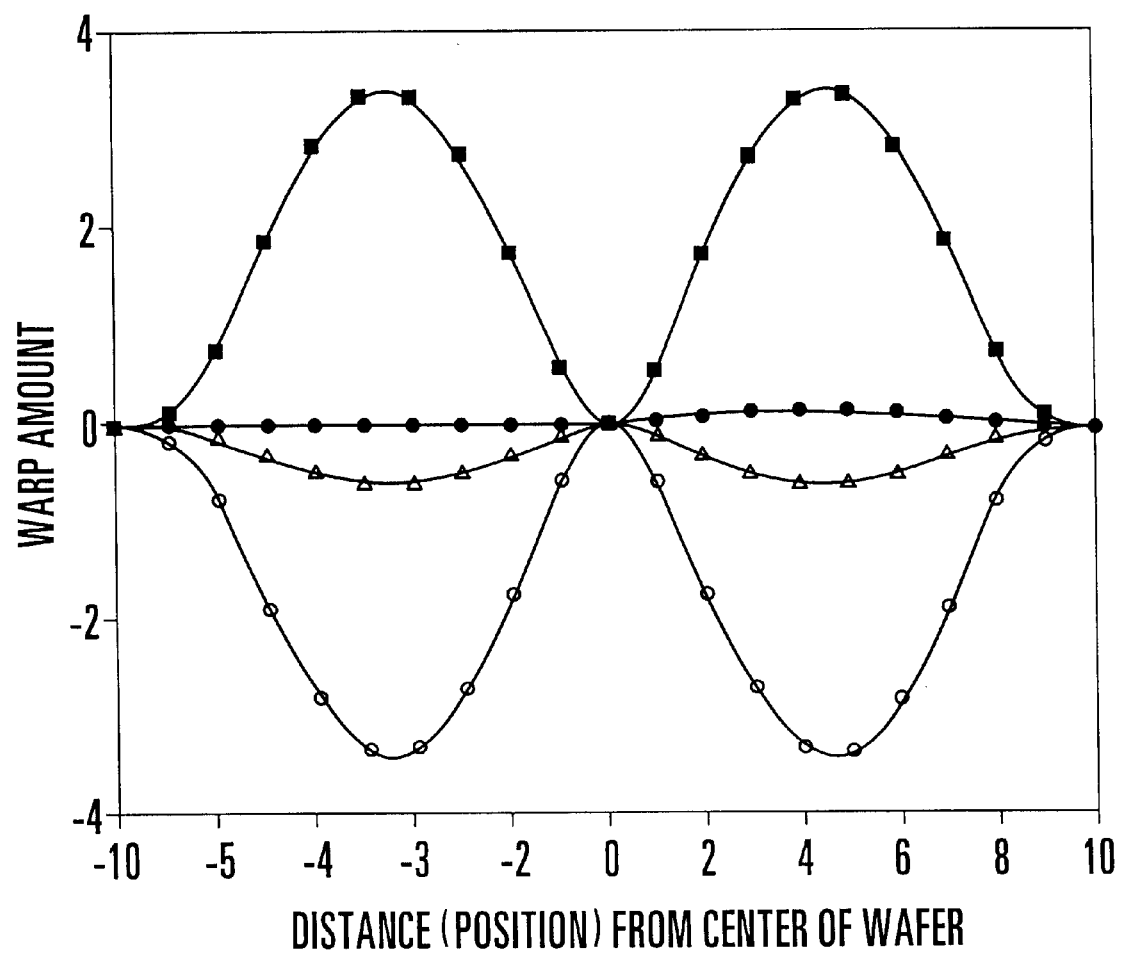
FIG. 6 is a graph showing the distribution of the warp of the diaphragm of a sapphire pressure sensor in accordance with a temperature change (temperature increase).

This warp is caused by temperature fluctuations when two sapphire substrates are adhered to each other, as shown in FIG. 6, such that their axes are displaced from each other (by about 10° in FIG. 6). This warp is the maximum on a line forming an angle of 45° or −45° with the C-axis projection direction of the crystal on one substrate, and on an intermediate region between the center of the diaphragm 102 and the end of the diaphragm 102. In this embodiment, the base 101 serves as one substrate, while the diaphragm 102 serves as the other substrate adhered to the base 101.

Therefore, when the sapphire diaphragm 102 is bonded to the sapphire base 101, the diaphragm 102 warps unless the C-axis projection directions of their crystals coincide to each other completely. However, the warp of the diaphragm 102 does not occur on the line in the C-axis projection direction of the crystal passing through the center of the diaphragm 102, as shown in FIG. 6. Also, this warp does not occur often on a line perpendicular to the C-axis projection direction of the crystal.

Therefore, the warp of the diaphragm 102 does not substantially occur even on a line in the C-axis projection direction of the crystal passing through the center of the major surface of the diaphragm 102. For this reason, the rectangular movable electrode 104 is arranged on the diaphragm 102 such that its longitudinal direction is parallel to the line in the C-axis projection direction of the crystal.

More specifically, the movable electrode 104 is arranged in a region where the warp of the diaphragm 102 is not substantially caused by the temperature. Even when the base 101 and diaphragm 102 are bonded to each other such that the C-axis projection directions of their crystals do not completely coincide with each other, the distance between the movable and stationary electrodes 104 and 103 does not substantially change upon temperature fluctuations.

When the length (long side) of the movable electrode 104 in the C-axis projection direction of the crystal is compared with the length (short side) thereof in a direction perpendicular to it, it suffices if the short side is shorter than the long side. In this embodiment, the movable electrode 104 is arranged on a line in the C-axis projection direction of the crystal passing through the center of the major surface of the diaphragm 102. However, in place of the movable electrode 104, the stationary electrode 103 may be arranged in this manner.

This will be described in detail. If the stationary electrode 103 is arranged on a line in the C-axis projection direction of the crystal passing through the center of the major surface of the diaphragm 102, the capacitance between the stationary and movable electrodes 103 and 104 is formed on only the stationary electrode 103. Accordingly, in this case as well, the capacitance between the stationary and movable electrodes 103 and 104 is formed at a region which is less influenced by the warp of the diaphragm 102 caused by temperature fluctuations. Therefore, the stationary electrode 103 may be arranged on a line in the C-axis projection direction passing through the major surface of the diaphragm 102. Obviously, both the stationary and movable electrodes 103 and 104 may be arranged to oppose each other on a line in the C-axis projection direction passing through the center of the major surface of the diaphragm 102.

The reference electrode 105 formed on the diaphragm 102, and the stationary electrodes 103 also form a capacitance between them. Since the reference electrode 105 is formed in the periphery of the diaphragm 102 close to the rim portion 101b, the warp amount of the reference electrode 105 accompanying warp of the diaphragm 102 is smaller than that of the movable electrode 104 arranged at the center of the diaphragm 102.

The dielectric constant of air in the capacitance chamber 101a changes in accordance with the humidity, to accordingly change the capacitances generated among the respective electrodes. If the change in capacitance between the stationary and movable electrodes 103 and 104 is observed with reference to the change in capacitance between the stationary and reference electrodes 103 and 105, the warp amount of the diaphragm 102 can be detected without fluctuation even if the dielectric constant of air in the capacitance chamber 101a changes.

For example, assume that the ratio of a change in capacitance between the stationary and reference electrodes 103 and 105 caused by the temperature fluctuations to a change in capacitance between the stationary and movable electrodes 103 and 104 is 1:X. When the capacitance between the stationary and reference electrodes 103 and 105 changes from "a" to "b" upon temperature fluctuations, the capacitance between the stationary and movable electrodes 103 and 104 is corrected by using "b/a·X".

<Second Embodiment>

A pressure sensor according to the second embodiment of the present invention will be described.

To suppress the influence of a change in dielectric constant caused by a temperature change of air in the capacitance chamber 101a by using the reference electrode 105, it is preferable that the reference electrode 105 is arranged on the outer periphery of the diaphragm 102 in the capacitance chamber 101a, as shown in FIGS. 1A and 1B. This is because of the following reason. Since a portion of the diaphragm 102 which deforms upon reception of a pressure is a region corresponding to the capacitance chamber 101a, the diaphragm 102 does not substantially deform near the rim portion 101b.

When, however, the reference electrode 105 is arranged at a portion on the diaphragm 102 to be in contact with the rim portion 10b, the reference electrode 105 is sandwiched by the diaphragm 102 and rim portion 101b due to the positional displacement occurring when bonding the diaphragm 102 and base 101 (rim portion 101b) to each other. When the reference electrode 105 is sandwiched between the diaphragm 102 and rim portion 101b, the diaphragm 102 and rim portion 101b cannot be bonded to each other through their specular polished surfaces.

To prevent this, the reference electrode 105 is arranged on the diaphragm 102 inside by a certain degree from the outer end (side wall position) of the capacitance chamber 101a.

When the movable electrode 104 is made from a metal film, its thermal expansion coefficient differs from that of the sapphire diaphragm 102. In this case, the thermal expansion coefficient of the movable electrode 104 is larger than that of the diaphragm 102, and a warp caused by a temperature change occurs also between the diaphragm 102 and movable electrode 104. The thinner the diaphragm 102, the more conspicuous the warp caused by a temperature change. In contrast to this, the thicker the diaphragm 102, the less the warp between the diaphragm 102 and movable electrode 104, and the larger the warp caused by the displacement of the plane orientation between the diaphragm 102 and base 101.

According to this embodiment, in a thin sapphire diaphragm used for detecting a low pressure, the warp caused by a temperature change between the diaphragm and the movable electrode is eliminated.

The arrangement of the pressure sensor according to the second embodiment will be described.

Figure 2A:
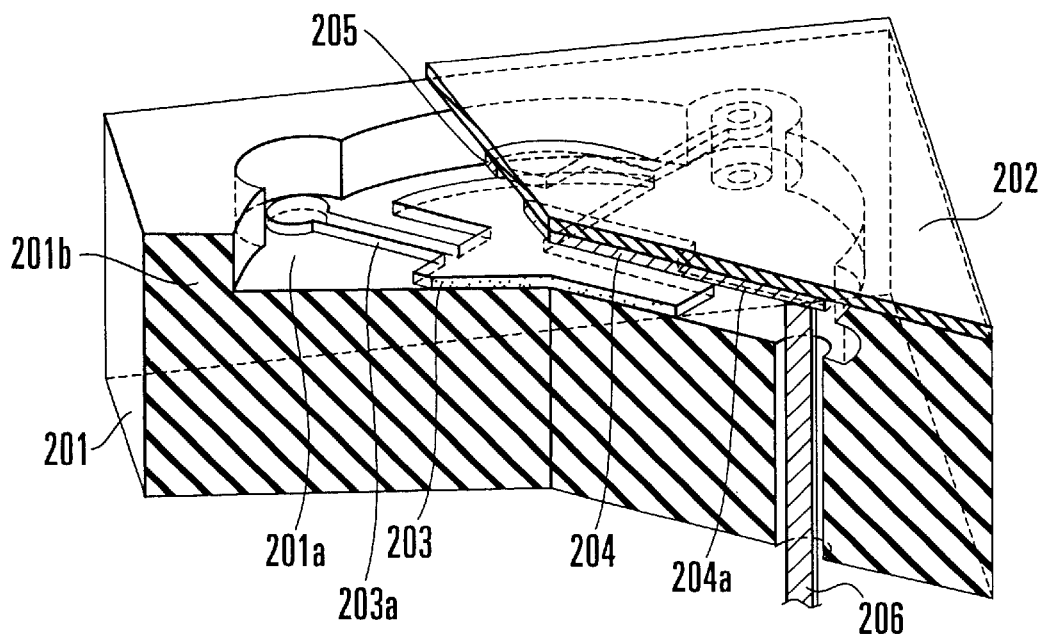
FIGS. 2A and 2B are a partially cutaway perspective view and a plan view, respectively, of a pressure sensor chip according to the second embodiment of the present invention.

Referring to FIG. 2A, a pressure sensor chip is constituted by a base 201 having a circular recessed capacitance chamber 201a, and a diaphragm 202. The diaphragm 202 is bonded to the major surface of a rim portion 201b surrounding the capacitance chamber 201a, thereby forming a closed space in the capacitance chamber 201a. The base 201 and diaphragm 202 are fabricated from R-plane sapphire substrates.

Figure 2B:
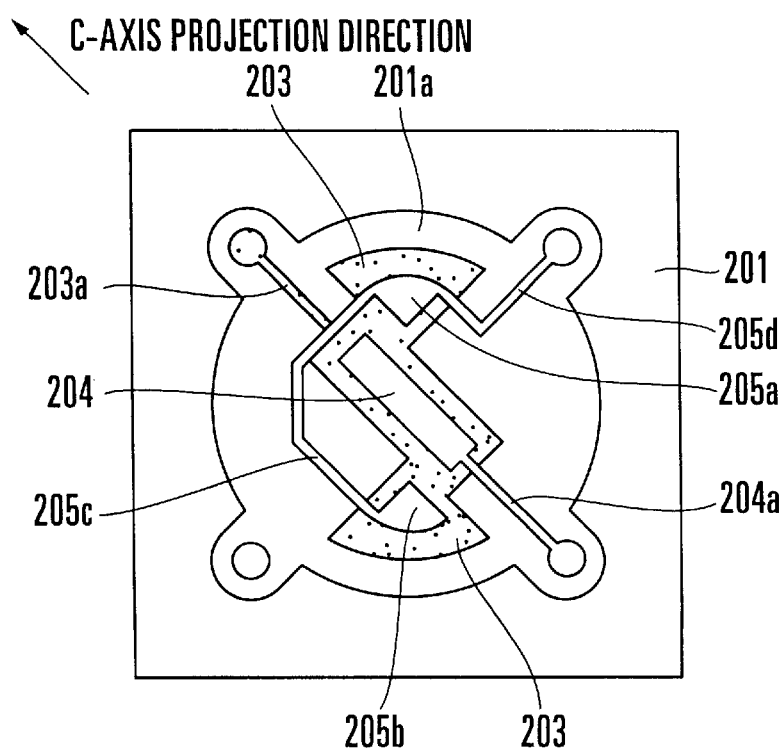

A stationary electrode 203 is fixed to the bottom surface of the capacitance chamber 201a, and a rectangular movable electrode 204 made of a conductive metal is fixed to the lower surface (the capacitance chamber 201a side) of the diaphragm 202 to oppose the stationary electrode 203. The movable electrode 204 is arranged such that its center overlaps almost the center of the diaphragm 202, and has a long side shorter than the diameter of the stationary electrode 203. The movable electrode 204 is arranged to extend in the C-axis projection direction of the sapphire crystal, as shown in FIG. 2B. More specifically, the movable electrode 204 is arranged such that its long side is parallel to the C-axis projection direction of the sapphire crystal.

At the periphery of the capacitance chamber 201a, the movable electrode 204 is connected to a pin 206 extending through the base 201, through a lead wiring line 204a. At the periphery of the capacitance chamber 201a, the stationary electrode 203 is connected to a pin (not shown) extending through the base 101, through a lead wiring line 203a.

The movable electrode 204 is formed on the diaphragm 202 into a rectangular shape extending in the C-axis projection direction of the crystal. Even if the plane orientation of the base 201 and that of the diaphragm 202 are somewhat displaced from each other, a change in distance between the movable and stationary electrodes 204 and 203 due to a temperature change is suppressed.

Fan-like reference electrodes 205a and 205b are arranged on the diaphragm 202 on a line clockwise forming an angle of 45° with the C-axis projection direction of the crystal. The reference electrodes 205a and 205b are connected to each other through a wiring line 205c, and are connected, on the periphery of the capacitance chamber 201a, to a pin (not shown) extending through the base 201, through a lead wiring line 205d. In the stationary electrode 203, its respective regions corresponding to the movable electrode 204 and the reference electrodes 205a and 205b are slightly enlarged and connected to each other.

When the C-axis projection direction of the crystal on the base 201 does not completely coincide with that of the diaphragm 202, on a line on the diaphragm 202 which clockwise forms an angle of 45° with the C-axis projection direction of the crystal 202, the warp of the diaphragm 202 appears as a change toward the base 201. The metal movable electrode 204 has a thermal expansion coefficient larger than that of the sapphire diaphragm 202. At the portion of the diaphragm 202 where the movable electrode 204 is formed, as the temperature increases, the diaphragm 202 warps toward the base 201.

Therefore, a portion of the diaphragm 202 on the line clockwise forming an angle of 45° with the C-axis projection direction of the crystal, and a portion of the diaphragm 202 where the movable electrode 204 is formed, warp in the same direction as the temperature increases. In other words, the movable electrode 204 and the reference electrodes 205a and 205b are displaced in the same direction in accordance with a temperature change.

In this manner, according to this embodiment, the reference electrodes 205a and 205b, and the movable electrode 204 are displaced in the same direction on the plane of the diaphragm 202 in accordance with a temperature change. As a result, even if the temperature changes, a change in positional relationship among the reference electrodes 205a and 205b, and the movable electrode 204 relative to each other with respect to the stationary electrode 203 can be prevented.

In particular, when the distances of the reference electrodes 205a and 205b from the center are adjusted on a line on the diaphragm 202 which clockwise forms an angle of 45° with the C-axis projection direction of the crystal, the relative positional relationship among the diaphragm 202 and the reference electrodes 205a and 205b is not substantially changed by a temperature change.

In this embodiment, the movable electrode 204 is made of a metal such as gold. However, the movable electrode 204 may be made of silicon having a smaller thermal expansion coefficient than that of sapphire. In this manner, when the movable electrode is formed of a material having a smaller thermal expansion coefficient than that of sapphire, the reference electrodes may be arranged on a line which clockwise forms an angle of 45° with the C-axis projection direction of the major surface of the diaphragm. In this case, as the temperature increases, the movable electrode and the reference electrodes are displaced away from the base.

In this embodiment, the stationary electrode 203 has a continuous shape to oppose the movable electrode 204 and reference electrodes 205a and 205b. However, the present invention is not limited to this. For example, the stationary electrode 203 may be formed into a circular shape, in the same manner as in the first embodiment. In this embodiment, since the stationary electrode 203 has the above shape, a detection error caused by the capacitances among the stationary electrode 203 and the lead wiring lines 204a and 205a can be suppressed.

In the above embodiments, the movable electrode is arranged on a line in the C-axis projection direction of the crystal passing through the center of the diaphragm, and has a rectangular shape extending in the C-axis projection direction of the crystal. However, the present invention is not limited to this. For example, the movable electrode may be arranged such that the longitudinal direction of its rectangular shape is perpendicular to the C-axis projection direction of the crystal on the major surface of the diaphragm. In this case, the movable electrode is arranged on a line perpendicular to the C-axis projection direction of the crystal and passing through the center of the capacitance chamber.

Figure 3A:
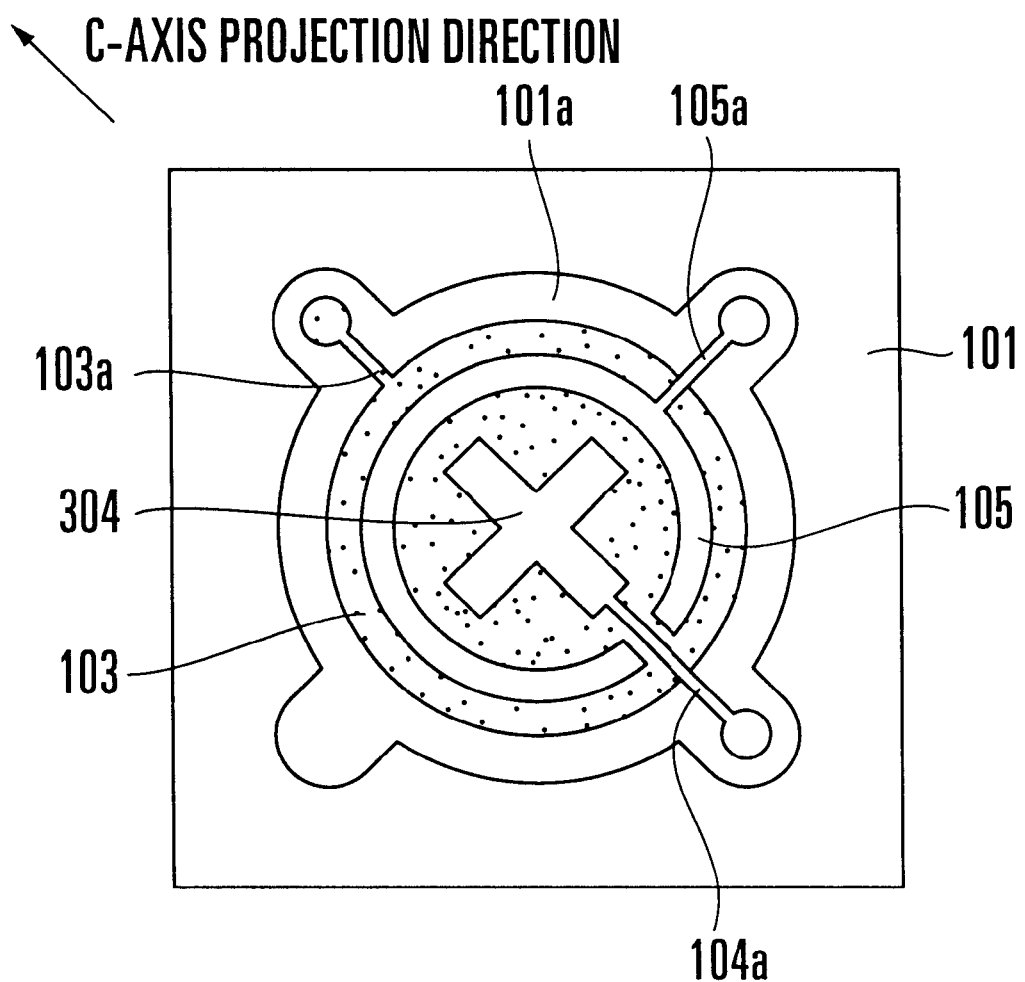
FIG. 3 is a plan view of a pressure sensor chip showing another example of a movable electrode.
Figure 4A:
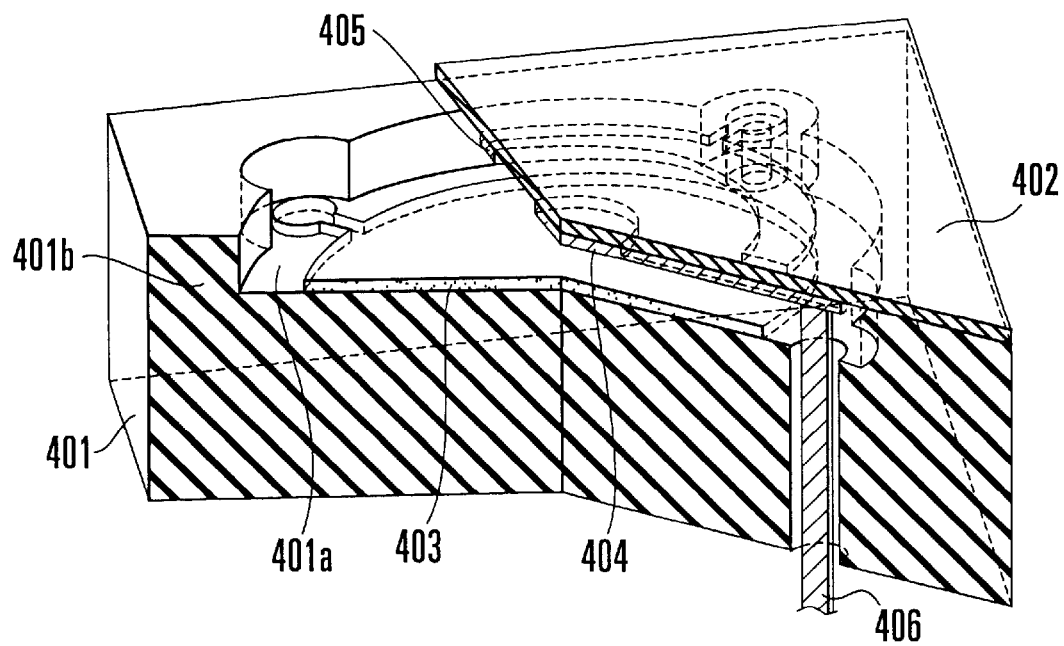
FIGS. 4A and 4B are a partially cutaway perspective view and a plan view, respectively, of a conventional pressure sensor chip.
Figure 4B:
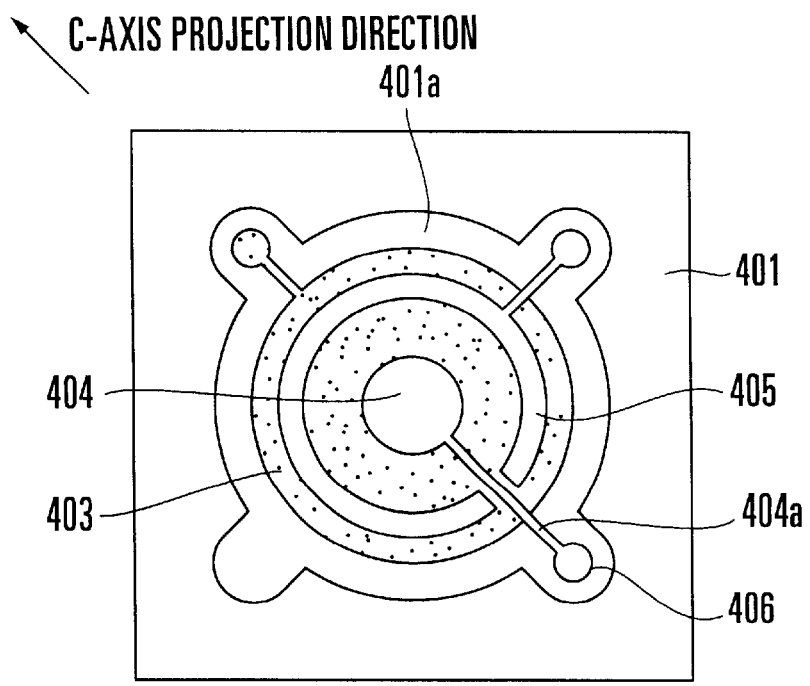
Figure 5:
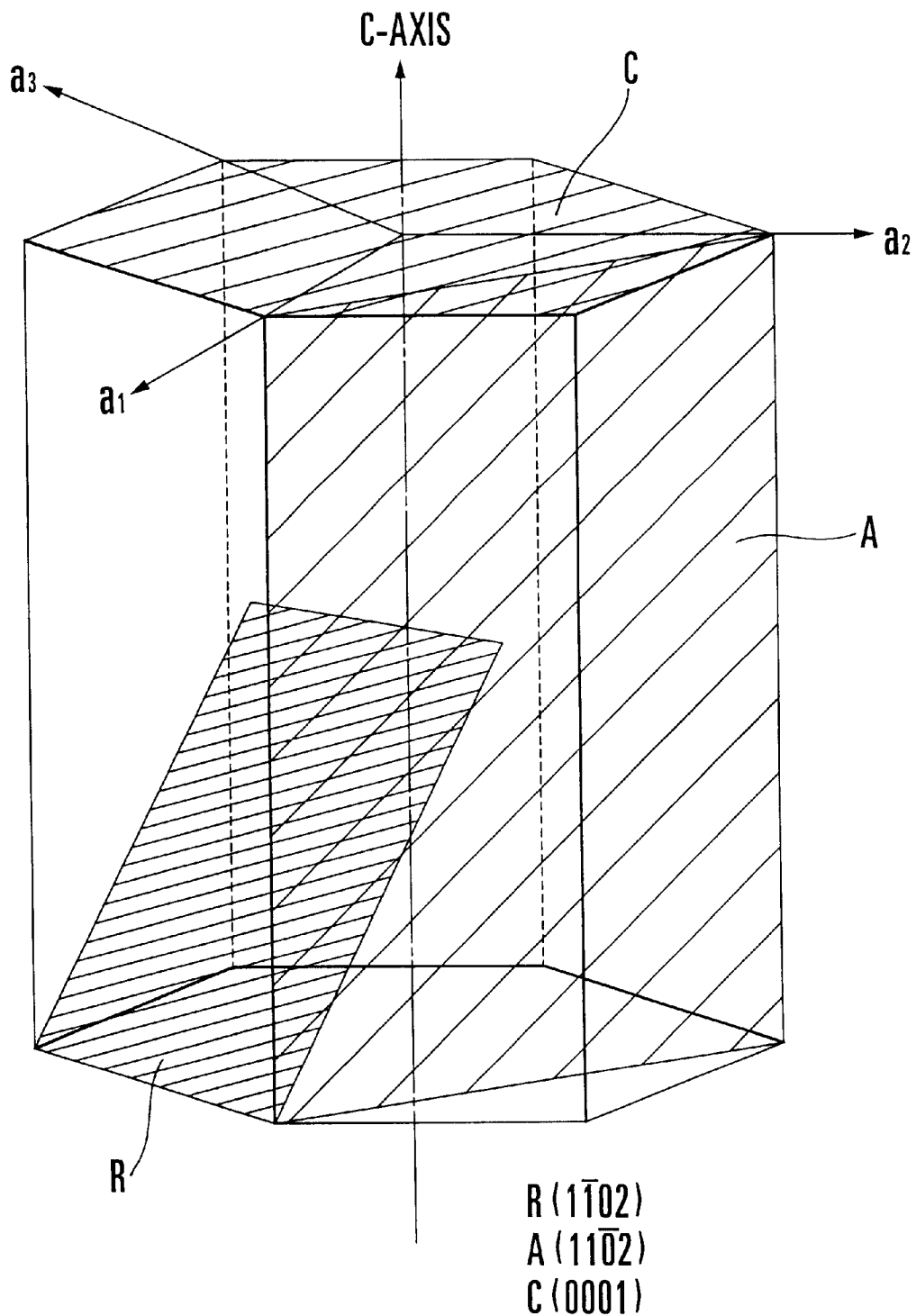
FIG. 5 is a perspective view schematically showing the state of a sapphire crystal.

As shown in FIG. 3, a movable electrode 304 may have a crisscross shape extending in two directions, i.e., the C-axis projection direction of the crystal and a direction perpendicular to it.

As has been described above, according to the present invention, even if the C-axis projection direction of the crystal of the base is displaced from the C-axis projection direction of the crystal of the diaphragm, at a region where the stationary and movable electrodes oppose each other, a temperature change does not substantially cause warp of the diaphragm.

This suppresses a change in distance between the movable and stationary electrodes that generate a capacitance. When a capacitance type pressure sensor is formed by bonding a diaphragm formed of an R-plane sapphire substrate to a base comprised of an R-plane sapphire substrate and having a capacitance chamber, even if the C-axis projection direction of the crystal of the substrate is different from that of the diaphragm, the pressure can be detected highly precisely.

What is claimed is:

1. A pressure sensor comprising:
   a sapphire base having an R-plane major surface;
   a sapphire diaphragm formed on said major surface of said base and having an R-plane major surface;
   a capacitance chamber having an upper surface covered with said diaphragm and having a recess formed in said major surface of said base;
   a stationary electrode fixed to a bottom surface of said capacitance chamber; and a movable electrode fixed to a lower surface of said diaphragm in said capacitance chamber to oppose said stationary electrode, wherein at least one of said movable and stationary electrodes has a shape extending on at least one of a line in a C-axis projection direction of a crystal passing through a center of said major surface of said diaphragm and a line in a direction perpendicular to the C-axis projection direction.

2. A sensor according to claim 1, wherein only one of said movable and stationary electrodes has a shape extending on at least one of a line in a C-axis projection direction of a crystal passing through a center of said major surface of said diaphragm and a line in a direction perpendicular to the C-axis projection direction.

3. A sensor according to claim 1, wherein both of said movable and stationary electrodes have a shape extending on at least one of a line in a C-axis projection direction of a crystal passing through a center of said major surface of said diaphragm and a line in a direction perpendicular to the C-axis projection direction.

4. A sensor according to claim 1, wherein at least one of said movable and stationary electrodes has a shape extending on only one of a line in a C-axis projection direction of a crystal passing through a center of said major surface of said diaphragm and a line in a direction perpendicular to the C-axis projection direction.

5. A sensor according to claim 1, wherein at least one of said movable and stationary electrodes has a crisscross shape extending on both of a line in a C-axis projection direction of a crystal passing through a center of said major surface of said diaphragm and a line in a direction perpendicular to the C-axis projection direction.

6. A sensor according to claim 1, further comprising a reference electrode fixed to said lower surface of said diaphragm around said movable electrode.

7. A sensor according to claim 6, wherein said reference electrode has a ring-like shape surrounding said movable electrode.

8. A sensor according to claim 6, wherein said reference electrode is arranged on a line forming an angle of 45° with the C-axis projection direction of the crystal passing through said center of said major surface of said diaphragm.

9. A sensor according to claim 6, wherein said stationary electrode has a shape continuously including at least regions opposing said movable and reference electrodes.

10. A sensor according to claim 9, wherein said stationary electrode has a circular shape.

* * * * *